Patented Mar. 25, 1952

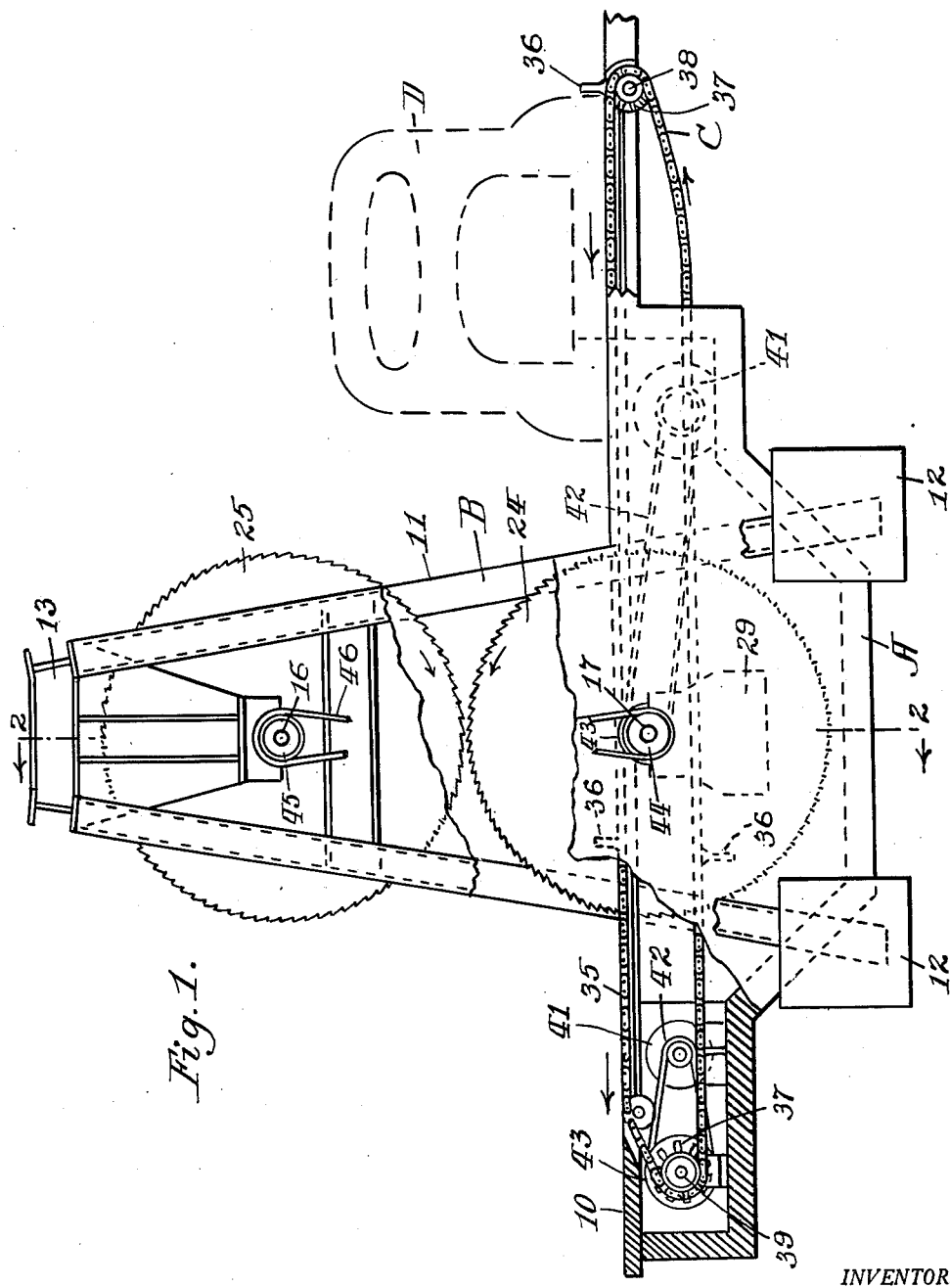

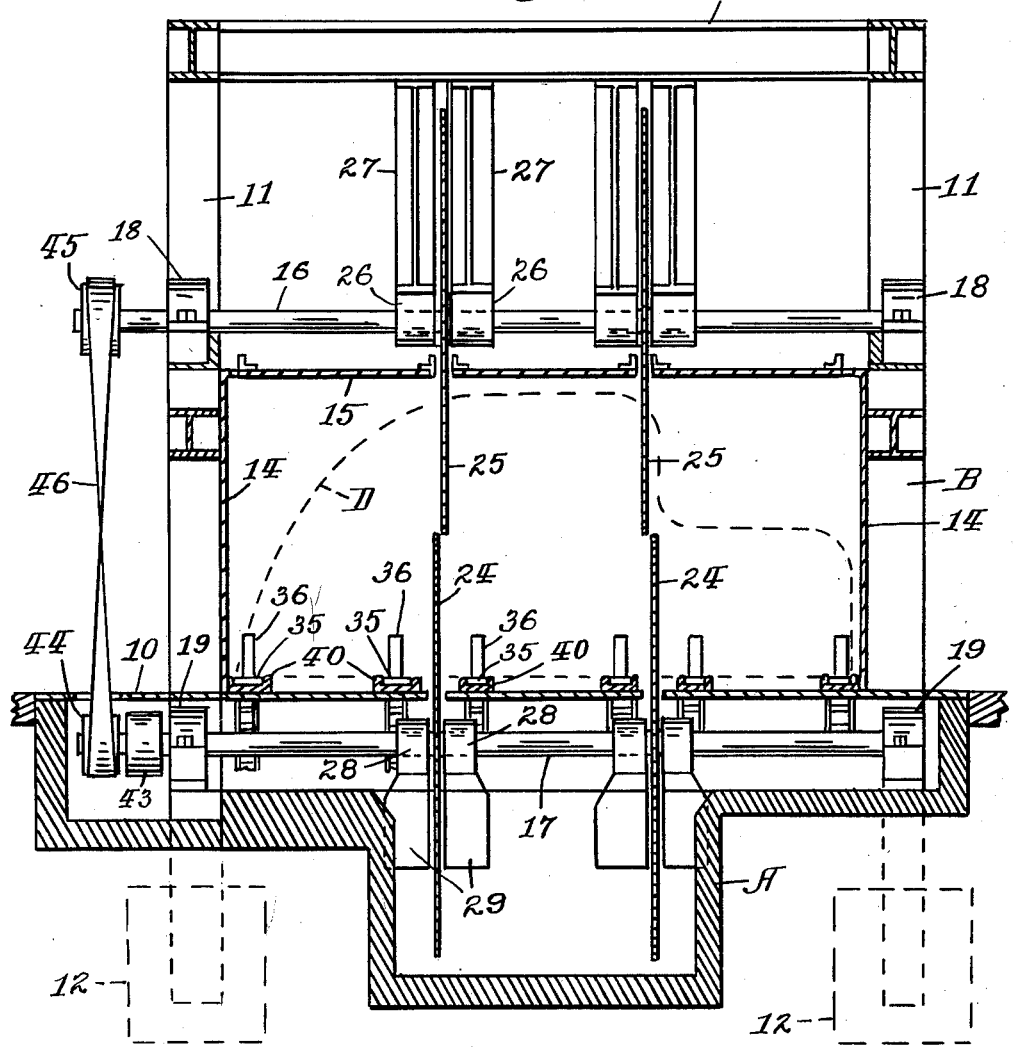

2,590,700

UNITED STATES PATENT OFFICE 2,590,700

CUTTING AND SALVAGING AUTOMOBILE BODIES

Bruce Irwin Hochman, Los Angeles, Calif.

Application April 13, 1950, Serial No. 155,684

2 Claims. (Cl. 29—70)

My invention relates to salvaging discarded automobile bodies and more particularly to a machine for cutting the bodies transversely into longitudinal sections so as to permit compressing by a power driven compressor into bales suitable for shipment to distant furnaces where the salvaged metal is recovered and applied to a useful purpose.

The primary object of my invention is to reduce automobile bodies into suitable condition so that they can be baled by a conventional power driven press, thus saving hand labor and expense and expediting the recovery of valuable metal for a useful purpose in a simple and continuous manner.

In the accompanying drawings forming part of this specification, Fig. 1 is a side elevation partly in section of my improved automobile body cutting or sawing machine, by which discarded automobile bodies after being stripped from their supporting frames are adapted to be cut transversely into a plurality of relatively short sections, suitable to be compressed into bales, and Fig. 2 is a section taken approximately on the line 2—2 of Fig. 1.

In the drawings, A represents the base or body of my improved cutting machine which as shown comprises a suitably shaped foundation which may be sunk into the ground to provide supporting means for the mechanical working parts of my improved apparatus. A suitable floor 10 of sheet metal or other suitable material is provided over the body A, which forms a work surface. Arranged above said work surface is a superstructure B, consisting of a pair of frames 11—11, which are disposed above opposite sides of the body and are supported at their lower ends by piers 12 which are set in the ground. These frames 11—11 are positioned between the forward and rearward ends of the body and have a transverse over-head supporting beam 13. A housing consisting of side walls 14 and a ceiling 15 is supported by the opposite end frames 11—11, and forms an open longitudinal protecting passage through which the automobile bodies pass freely while being cut into sections as hereinafter described.

Two upper and lower transverse horizontal drive shafts 16 and 17 are journaled respectively in end bearings 18 and 19 on portions of the frames 11—11. The lower drive shaft 17 supports a pair of laterally spaced longitudinally disposed saw toothed cutting disks 24—24, and the upper drive shaft 16 supports a pair of corresponding cutting disks 25—25 of usual hard wear resisting metal. These disks are of corresponding large diameter and are revolved at high speed at their adjacent edges towards the delivery end of the machine at high speed. The axes of the disks and their drive shafts are arranged respectively below the work surface 10 and above the ceiling 15 of the housing and the diameter of said cutting disks is sufficient so that only a portion of their blades intersect but cut the entire height of the automobile bodies into relatively short sections as the bodies are passed longitudinally through the housing. The height of the ceiling 15 above the work surface 10 and the width of the housing are sufficient to permit the entire automobile body, such as D, while supported by a conveyor C, to travel sidewise into the bite of the cutting disks and to be cut into sections. The members of the upper and lower pairs of cutting disks are also respectively spaced apart so as to divide the entire chamber within the housing into substantially three equal widths and cause the cutting of each automobile body into a corresponding number of sections. The members of each adjacent pair of upper and lower cutting disks are offset laterally, as shown in Fig. 2, to provide clearance between their adjacent edges while simultaneously producing a clean cut separation between the sections of the automobile body. The offset position of the members of each pair of cutting disks prevents over heating and permits free action of the disks.

The cutting disks are revolved at relatively high speed by their shafts 16 and 17, the speed in practice having been upwards of 20 thousand R. P. M. Due to this high speed and the volume of work performed thereby, the shafts are additionally supported by journal bearings which are disposed evenly in relation to each companion cutting disk. A pair of these journal bearings 26—26 is provided for the upper shaft 16 adjacent to each of the cutting disks 25—25, said bearings in turn being hung by hangers 27—27 from the over-head supporting beams 13. Also a pair of these journal bearings 28—28 is provided for the lower shaft 17 adjacent to the cutting disks 24—24, said bearings in turn being supported from below by piers 29.

A conveyor C is provided which is adapted to feed a series of automobile bodies sidewise into cutting engagement with the saw disks so that the bodies are completely cut laterally into three longitudinal sections while passing through the machine. This conveyor may be of any suitable well known construction and as shown consists of a pair of laterally spaced endless link belts 35—35 for transporting the body from the receiving end of the machine into the bite of the cutting disks and continuing the transfer of the cut sections to the tail end, where they are delivered. Each section has a pair of link belts 35—35 by which abutments 36 thereon engage and assist in causing each automobile body to be cut into sections. The conveyor belts are engaged by suitable sprockets 37 which are mounted upon the idle shaft 38 at the receiving end and are driven by shaft 39 near the delivery end of the machine. The upper laps of the pairs of belts travel in longitudinal channel members 40, (Fig. 2), which are supported horizontally on the floor 10 of the body A, it being understood that there is a pair of feed belts, and companion guide channel members 40 for each section into which the automobile body is cut by the cutting disks.

Comparatively reduced effort and work is required to feed the automobile bodies and their apportioned cut sections through the machine due to the bodies being cut substantially one half by the upper cutting disks and the remaining half by the lower cutting disks. In this manner the entire cutting action is evenly distributed which not only saves power but promotes smooth and even feeding and operation of the entire apparatus.

The two cutting disk drive shafts 16 and 17 are rotated forwardly by a prime mover such as the motor 41, belt 42, pulley 43 and the additional pulleys 44, 45 and belt 46.

Operation

The cutting disks and conveyor are revolved forwardly continuously as indicated by the arrows and a series of discarded automobile bodies such as D, shown by broken lines, after being stripped from their chassis frames are placed, one at a time, in transverse position across the pairs of conveyor belts 35—35, at the receiving end of the machine. For this step of placing the bodies, the latter may be readily handled by the use of a power driven crane, (not shown). When thus placed the abutments 36 on the forwardly moving belts engage each body and feed it into the bite of the gang of upper and lower cutting disks, whereby the body is cut into three longitudinal sections of suitable dimensions so as to be readily compressed by a power driven compressor into solid bales of metal suitable for economical shipping to reduction furnaces, where the salvaged metal thus prepared is applied to a useful purpose. By the use of cooperating upper and lower cutting disks such as are provided by my improvements, the work performed facilitates the reduction of the automobile bodies into a condition which enables them to be more readily handled and placed in a conventional compressor for reduction into solid bales of metal suitable for transporting.

The machine is adapted to cut the automobile bodies into as many sections as desired, the number of sections being variable, also modifications of construction are contemplated within the scope of the following claims.

I claim:

1. In a machine for salvaging discarded automobile bodies, a supporting base, a superstructure mounted on said base, a lower horizontal drive shaft journaled in said base, an upper horizontal drive shaft journaled in said superstructure in substantial vertical alignment with said lower shaft, the distance between said drive shafts permitting passage of an automobile body therethrough, a pair of lower cutting disks mounted upon and rotated by said lower drive shaft, a pair of upper cutting disks mounted upon and rotated by said upper drive shaft, the corresponding cutting edges of each pair of disks being in close proximity one to the other and being slightly offset laterally to avoid overheating of the cutting edges, means for driving said shafts at a high speed, and conveyor means for feeding discarded automobile bodies sidewise into the bite of said cutting discs, whereby said bodies are cut into relatively short sections suitable to be compressed into bales.

2. In a machine for salvaging discarded automobile bodies, a supporting base, a superstructure mounted on said base, a lower horizontal drive shaft journaled in said base, an upper horizontal drive shaft journaled in said superstructure in substantial vertical alignment with said lower shaft, the distance between said drive shafts permitting passage of an automobile body therethrough, a pair of lower cutting disks mounted upon and rotated by said lower drive shaft, a pair of upper cutting discs mounted upon and rotated by said upper drive shaft, the corresponding cutting edges of each pair of disks being in close proximity one to the other and being slightly offset laterally to avoid overheating of the cutting edges, means for driving said shafts at a high speed in opposite directions, and conveyor means for feeding discarded automobile bodies sidewise into the bite of said cutting discs, whereby said bodies are cut into relatively short sections suitable to be compressed into bales.

BRUCE IRWIN HOCHMAN.

REFERENCES CITED

The following references are of record in the file of this patent:

UNITED STATES PATENTS

| Number | Name | Date |
|---|---|---|
| 1,206,925 | Schleichter et al. | Dec. 5, 1916 |
| 1,567,289 | Munroe | Dec. 29, 1925 |
| 1,885,188 | Deutsch | Nov. 1, 1932 |